United States Patent [19]

Pillekamp

[11] Patent Number: 5,594,737
[45] Date of Patent: Jan. 14, 1997

[54] ARRANGEMENT FOR CONTROLLING A TRANSMITTING/RECEIVING DEVICE OF BASE STATIONS AND/OR MOBILE UNITS, IN PARTICULAR OF A CORDLESS TELEPHONE SYSTEM

[75] Inventor: Klaus-Dieter Pillekamp, Erkrath, Germany

[73] Assignee: Siemens Aktiengesellschaft, Munich, Germany

[21] Appl. No.: 424,275

[22] PCT Filed: Nov. 2, 1993

[86] PCT No.: PCT/DE93/01045

§ 371 Date: Apr. 28, 1995

§ 102(e) Date: Apr. 28, 1995

[87] PCT Pub. No.: WO94/10812

PCT Pub. Date: May 11, 1994

[30] Foreign Application Priority Data

Nov. 2, 1992 [DE] Germany .......................... 9214886 U

[51] Int. Cl.$^6$ .............................. H04J 3/16; H04M 11/00
[52] U.S. Cl. .................... 370/278; 370/280; 370/337; 379/61; 455/38.3
[58] Field of Search ...................... 455/38.3, 127, 455/343; 370/95.3, 80, 29, 95.1, 32, 85.8, 95.2; 379/61

[56] References Cited

U.S. PATENT DOCUMENTS

| | | | |
|---|---|---|---|
| 5,196,806 | 3/1993 | Ichihara | 330/137 |
| 5,251,325 | 10/1993 | Davis et al. | 455/38.3 |
| 5,260,944 | 11/1993 | Tomabechi | 370/95.1 |
| 5,278,832 | 1/1994 | Binzel et al. | 370/95.3 |
| 5,493,705 | 2/1996 | Tanemura | 455/127 |
| 5,509,015 | 4/1996 | Tiedemann | 370/95.3 |
| 5,517,679 | 3/1996 | Yahagi | 455/38.3 |

FOREIGN PATENT DOCUMENTS

| | | |
|---|---|---|
| 2670968 | 6/1992 | France . |
| 2249922 | 5/1992 | United Kingdom . |
| WO9213395 | 8/1992 | WIPO . |

OTHER PUBLICATIONS

"Auch ohne Schnur auf Draht", Wolf, Telcom report 10 (1987), Heft 2, pp. 130–137. German.

"Digital European Cordless Telecommunications System" (DECT) Standard (draft prETS 300 175-3) (1991), pp. 1–177.

"Digital European Cordless Telecommunications System" (DECT) Standard (draft prETS 300 175-2) (1991), pp. 1–36.

*Primary Examiner*—Douglas W. Olms
*Assistant Examiner*—Matthew C. Phillips
*Attorney, Agent, or Firm*—Hill, Steadman & Simpson

[57] ABSTRACT

To be able to operate base stations (FT) and mobile units (PT) of a cordless telephone system with the lowest possible use of energy, a processor (M-CT) of the base station (FT) and of the mobile unit (PT) contains a controlling program (CP) which is designed in such a way that the transmitting device (RE-T) of a transmitting unit (FT, PT) is activated essentially only at transmission times (SZ) and the receiving device (RE-R) of a receiving unit (PT, FT) is activated essentially only at reception times (EZ).

8 Claims, 3 Drawing Sheets

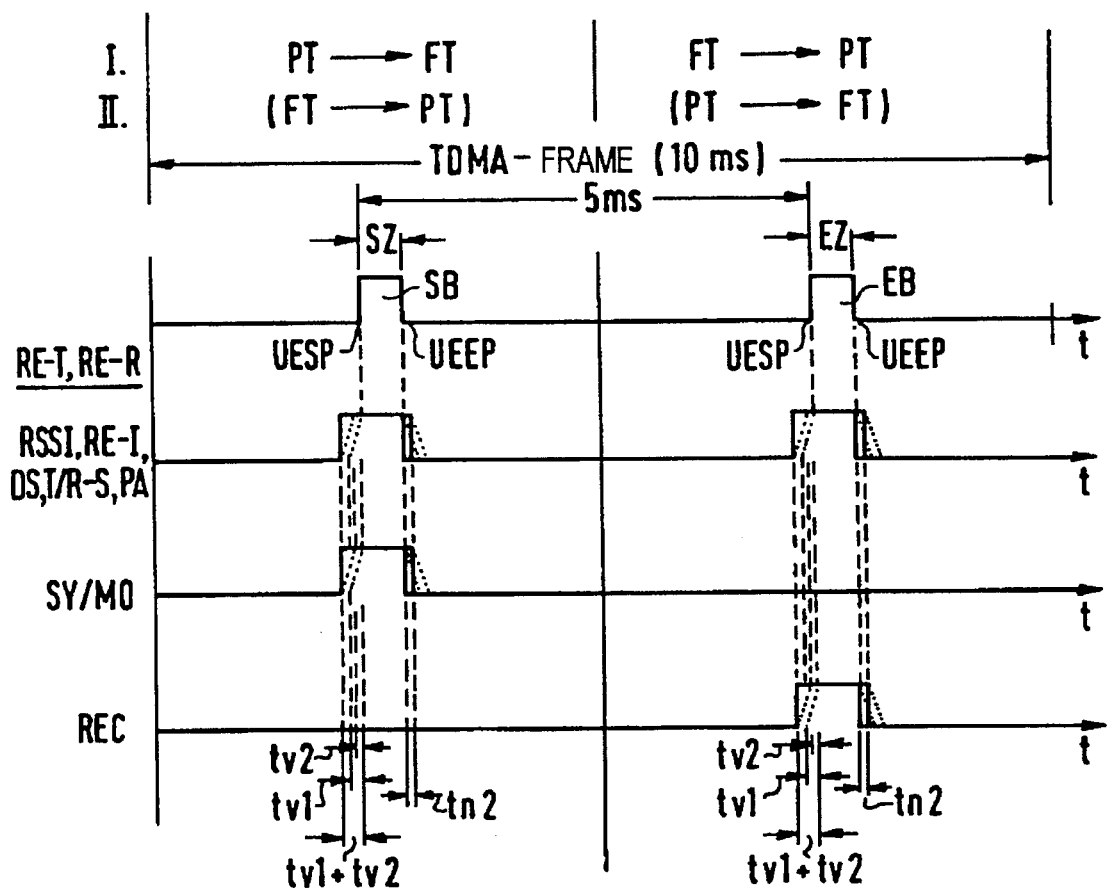

5,594,737

ARRANGEMENT FOR CONTROLLING A TRANSMITTING/RECEIVING DEVICE OF BASE STATIONS AND/OR MOBILE UNITS, IN PARTICULAR OF A CORDLESS TELEPHONE SYSTEM

BACKGROUND OF THE INVENTION

The invention relates to an arrangement for controlling a transmitting/receiving device of base stations and/or mobile units in particular of a cordless telephone system.

Cordless telephone systems, for example systems based on the TDMA principle (Time Division Multiple Access) (for example DECT cordless system, CT2 cordless system etc.) and systems based on the CDMA principle (Code Division Multiple Access), may be designed in such a way that voice to be transmitted is compressed on the transmission side, is transmitted by the transmitting device of the transmitting unit (base station, mobile unit) within a radio link, is received by the receiving device of the receiving unit (mobile unit, base station) and is expandeed (burst technique).

Great Britain reference GB-A-2 249 922 (corresponding to U.S. Pat. No. 5,260,944) discloses, for example, a mobile TDMA radio telecommunication system which has the characteristics mentioned above.

SUMMARY OF THE INVENTION

The object on which the invention is based consists in operating base stations and/or mobile units, in particular of a cordless telephone system, with the lowest possible use of energy.

The present invention is an arrangement for controlling a transmitting/ receiving device of base stations and/or mobile units, in particular of a cordless telephone system, comprising: each of the base stations and the mobile units having a processor, to which a controlling program is assigned and voice to be transmitted being compressed on a transmission side, transmitted by a transmitting device of a first transmitting/receiving device within a radio link and received by a receiving device of a second transmitting/receiving device and expanded; the controlling program effecting actuation of the transmitting device of the transmitting unit substantially only during fixed, predetermined transmission times within a transmission time frame and effecting actuation of the receiving device of the receiving unit substantially only during fixed, predetermined reception times within the transmission time frame; modules for monitoring that determines the transmission time frame, the modules being excepted from the time-related activation.

In the case of base stations and/or mobile units, in particular a cordless telephone system, in order to reduce the use of energy required for the operation of the base station and/or of the mobile unit with the exception of the modules necessary for frame-clock monitoring (e.g. in a transmitting/ receiving device of the base station and/or of the mobile unit)—in particular whenever the devices are supplied stationarily, for example via a battery, the transmitting/receiving device is switched on with a certain time lead with respect to the transmission/reception burst (FIG. 4) occurring at periodic time intervals in the transmission technique (for example TDMA or CDMA methods). The lead time may in this case comprise a first part-lead time and a second part-lead time, the first part-lead time being understood as meaning the running up time required by the electronic components of the transmitting/receiving device from the switching-on instant to the beginning of the transmission/ reception burst and the second part-lead time being understood as meaning the time which ensures that the transmitting/receiving device is activated during the transmission/ reception burst. In order that the transmitting/receiving device is also switched on over the entire duration of the transmission/reception burst, the transmitting/receiving device is switched off with the end of the transmission/ reception burst. In this case, as with the switching on of the transmitting/receiving device—in analogy with the second part-lead time provided there—it is also possible to provide a corresponding part-lag time for the switching off of the transmitting/receiving device, in order to ensure that the transmitting/receiving device is also switched on during the entire duration of the transmission/reception burst.

Advantageous further developments of the invention are specified in the subclaims.

In further embodiments of the present invention, the transmitting/receiving device contains on the one hand a plurality of subdevices (central functions), such as for example switching devices, an amplifier and an interface, and on the other hand a transmitter and receiver, which are switched on and off simultaneously in one embodiment and at different times in another embodiment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 shows the time relationship between transmission and reception burst and the activation of the transmitting/ receiving device according to FIGS. 1 and 2.

DESCRIPTION OF THE PREFERRED EMBODIMENTS

Figure 1:
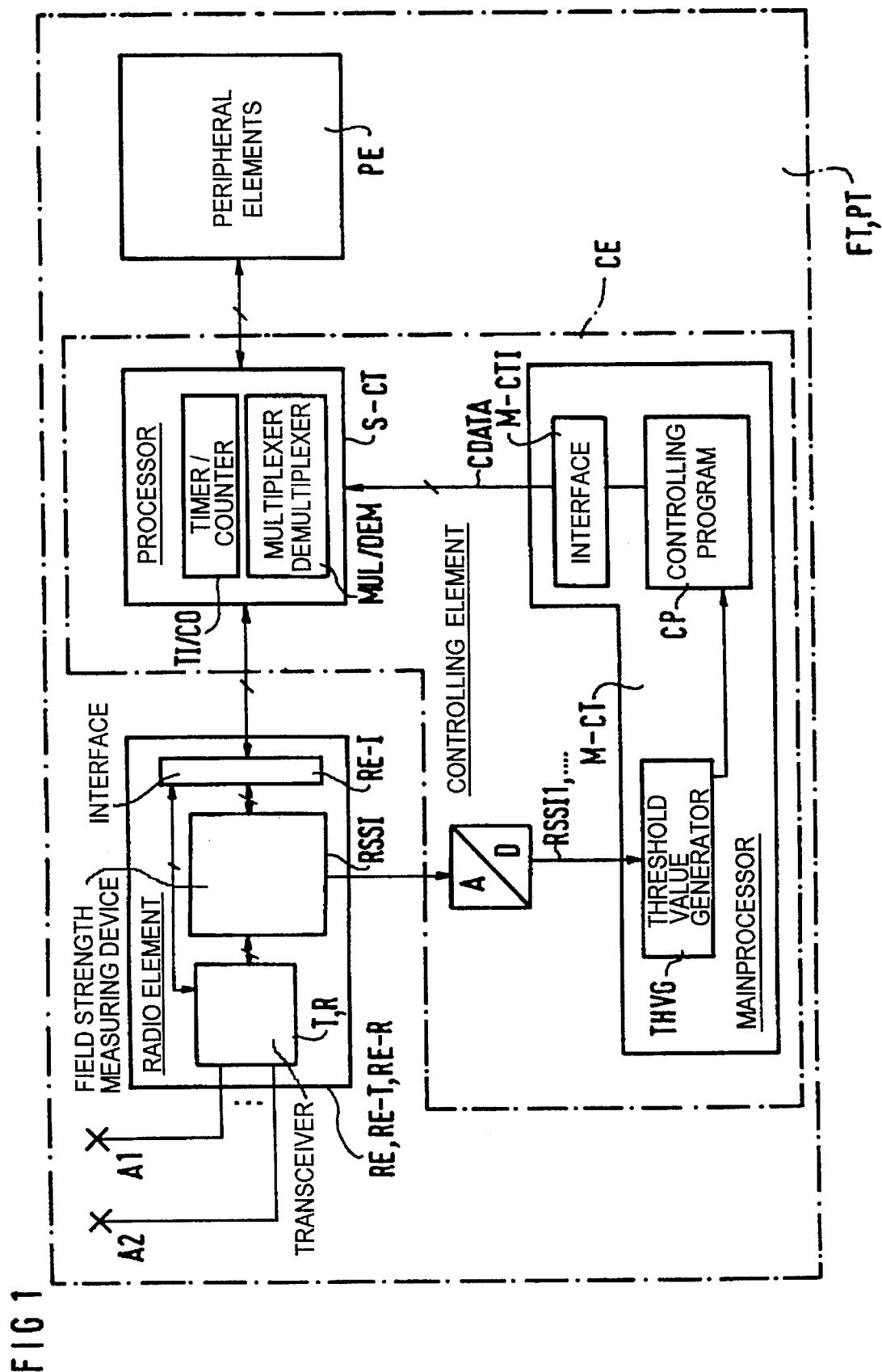
FIG. 1 shows an arrangement for controlling a transmitting/receiving device in a base station or a mobile unit of a cordless telephone system.

FIG. 1 shows the basic circuitry of a base station FT or of a mobile unit PT of a cordless telephone system. Both the base station FT and the mobile unit PT contain a radio element RE - in the following also referred to as transmitting/receiving device RE-T, RE-R —, a controlling element CE and peripheral elements PE, which are combined in the "peripheral elements" functional block. In the following description, it is assumed that for the cordless telephone system the DECT standard (Digital European Cordless Telecommunication) is implemented. However, the invention is not restricted to this. For instance, the invention can also be readily used for comparable standards, such as for example the CT2 or GSM standard.

While base station FT and mobile unit PT do not differ with respect to the controlling element CE and the radio element RE or the transmitting/receiving device RE-T, RE-R—to the extent to which consideration is relevant for the invention —, the peripheral elements PE of the base station FT and of the mobile unit PT are differently designed.

For instance, the peripheral elements PE in the case of the base station FT—on the basis of base stations of known cordless telephone systems (Wolf, Klahs: "Auch ohne Schnur "auf Draht"" ["Keeping in touch" even without a cord], Telcom Report 10, 1987, Issue 2, pages 130 et seq., for example page 134)—comprise for example internal subscriber circuits or exchange or PBX circuits with upstream ADPCM encoding/decoding devices and an internal peripheral controller, while in the peripheral elements PE of the mobile unit PT—on the basis of mobile units of known cordless telephone systems (Telcom Report 10, 1987, Issue 2, page 135)—there are contained for example a microphone, a piezo receiver capsule, a piezo ringer, a storage battery, a keypad, an LED display, and also VF and ringer amplifiers.

The abovementioned peripheral elements PE of the base station FT and of the mobile unit PT may also be substituted by other elements without in any way restricting the invention.

The elements of the circuitry of the base station FT and of the mobile unit PT according to FIG. 1 which are relevant for the invention are the radio element RE or the transmitting/receiving device RE-T, RE-R and the controlling element CE. Assigned in this case to the radio element RE, for the transmission and reception of radio signals (for example TDMA or CDMA radio signals) are two antennas A1, A2, which act both as a transmitting and a receiving antenna. Alternatively, however, it is also possible without in any way restricting the invention to assign one antenna or more than two antennas to the radio element RE.

The radio element RE has furthermore—as represented in FIG. 1 by three functional blocks—a transceiver T, R, a field strength measuring device (Radio Signal Strength Indicator) RSSI and an interface RE-I, which are interconnected in the radio element RE in the way represented. The field strength measuring device RSSI measures the field strength of the radio signals selected via the antennas A1, A2 and in the transceiver T, R.

How the transceiver T, R is specifically constructed and connected to the field strength measuring device RSSI and to the interface RE-I is shown and described with reference to FIG. 2.

The field strength measuring device RSSI serves in general for testing whether a channel is loaded (cf. DECT Draft prETS 300 175-3: 1991, page 164). The specification as to how the field strength is to be measured is given in the DECT standard (cf. DECT Draft prETS 300 175-2: 1991, page 31, 6.2 and page 38, 8.3). The channel loading is in this case established by measuring the field strength (minimum field strength) of received radio signals, the measurement results RSSI1, . . . subsequently being fed via an analog/digital converter A/D to a threshold value generator (Threshold Value Generator) THVG, integrated in a main processor M-CT of the controlling element CE. The threshold value generator THVG in this case forms during running operation of the base station FT or of the mobile unit PT continually updated values, which are incorporated by the main processor M-CT in a controlling program CP and serve for driving the antennas A1, A2. With the information received from the threshold value generator THVG on the channel loading (input variable), controlling data CDATA are formed by the controlling program CP and are fed via a main processor interface M-CTI to a subprocessor (sub-controller) S-CT.

The subprocessor S-CT is referred to in the base station FT as a time switch controller and in the mobile unit PT as a burst mode controller. Assigned to the subprocessor S-CT is, inter alia, a multiplex/demultiplex unit MUL/DEM, which generates or receives 1.152 Mbit/s data in the DECT burst format. In addition, the subprocessor S-CT assumes controlling functions for the radio element RE and the peripheral elements PE. In the case of the base station FT, the multiplex/demultiplex unit MUL/DEM of the subprocessor S-CT assigns to the data packets received or to be sent, for example, up to six internal or three external telephone connections in the time division multiple access TDMA method or in the code division multiple access CDMA method. In addition, the subprocessor S-CT contains a timer/counter TI/CO, which supplies clock pulses to the subprocessor S-CT, in particular with respect to the timing of bits, time slots and TDMA or CDMA frames.

Figure 2:
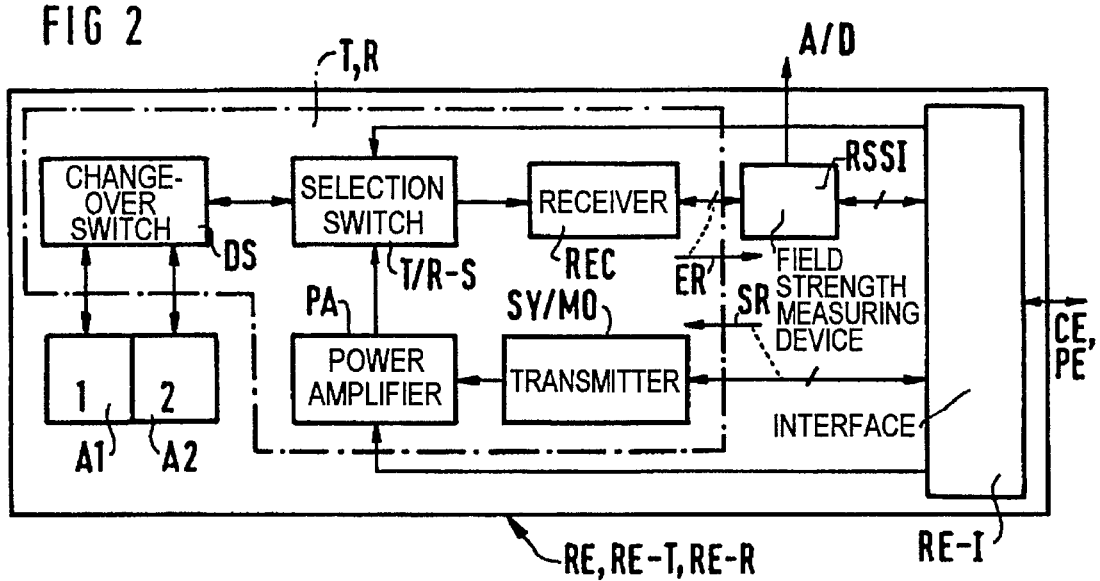
FIG. 2 shows the basic construction of the transmitting/ receiving device according to FIG. 1.

FIG. 2 shows the detailed structure of the radio element RE with respect to the transceiver T, R. The transceiver T, R contains functional blocks which are independent of and dependent on the transmission directions, a transmitting direction SR and receiving direction ER.

Belonging to the independent functional blocks are two switching elements connected upstream in the stated sequence of the antennas A1, A2, a change-over switch (Diversity Switch) DS and a selection switch (T/R switch) T/R-S, switching back and forth between the transmitting direction SR and receiving direction ER.

The functional blocks of the transceiver T, R which are dependent on the respective transmission direction are formed, in the transmitting direction SR in the stated sequence, by two modules connected between the interface RE-I of the radio element RE and the selection switch T/R-S, a synthesizer/modulator SY/MO—also referred to in the following as transmitter—and a power amplifier PA and, in the receiving direction ER, by a receiver REC, connected between the field strength measuring device RSSI and the selection switch T/R-S.

With the exception of the change-over switch DS, all the other modules or functional blocks of the transceiver T, R are also contained in the latter even if the radio element RE is assigned, for example, only one antenna.

The mode of operation of the cordless telecommunication in a cordless telecommunication system having the base station FT and the mobile unit PT according to FIGS. 1 and 2 is indicated in principle by the already mentioned printed publications (Telcam Report 10, 1987, Issue 2, pages 130 et seq. and DECT Draft prETS 175-3: 1991, entire document). Thus, in the cordless telecommication system with a bidirectional (transmitter/receiver or receiver/transmitter) radio link between the base station FT and the mobile unit PT, voice is on the one hand compressed and transmitted on the transmission side and on the other hand is received and expanded on the reception side. In order to reduce the expenditure of energy required for this in the base station FT and the mobile unit PT, in particular whenever the base station FT and the mobile unit PT are supplied with energy stationarily (for example by a battery or a storage battery), the transmitting device RE-T of the base station FT and of the mobile unit PT are activated essentially only at transmission times and the receiving device RE-R of the base station FT and of the mobile unit PT is activated essentially only at reception times (FIG. 4).

Figure 3:
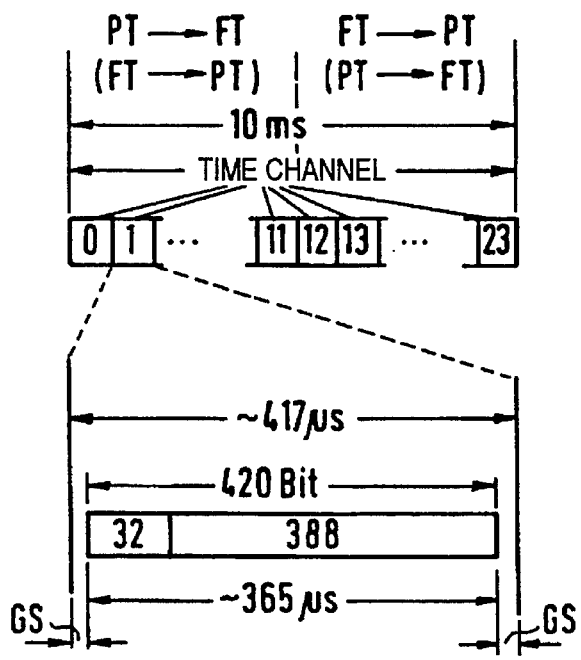
FIG. 3 shows a TDMA time frame in a cordless telephone system in accordance with the DECT standard.

FIG. 3 shows a DECT-specific TDMA time frame for cordless telephone systems in accordance with the DECT standard, as is represented in German Utility Models G 92 14 885 (FIG. 3 therein) and G 92 14 899 (FIG. 2 therein). For the cordless communication in accordance with the DECT standard, a dynamic channel selection is carried out from about 120 available channels. The 120 channels result from the fact that, in the case of the DECT standard, ten frequency bands between 1.8 and 1.9 GHz are used, operating in each frequency band according to the representation in FIG. 3 in a time division multiple access (TDMA) with a time division multiplex frame of 10 ms. In this time division multiplex frame 24 (from 0 to 23) time channels are defined and, as a result, a frame pattern is prescribed. This frame pattern is then used in such a way that, for each frequency band, for exhale 12 mobile units PT can operate simultaneously with a base station FT of a DECT communication system in duplex mode (PT-FT and FT-PT or FT-PT and PT-FT). In this case, a time slot of respectively 417 µs is assigned to the 24 time channels. This time slot indicates the time in which the information (data) is transmitted. This transmission of information in duplex mode is also referred to as the ping-pong method, because transmission takes place at a certain instant and receiving takes place at another instant. In the case of this ping-pong method, in each time slot a time frame or pulse (burst) of 365 µs, which corresponds approximately to a frame length of 420 bits, is transmitted with a data throughput of 42 kbit/s. Referred to the time division multiplex frame, and bearing in mind that in a guard space GS at both ends of the time frame there are in each case 30 bits available for avoiding overlaps caused by adjacent time slots, a total data throughput of 1.152 Mbit/s is obtained.

On the basis of the descriptions given above with respect to FIG. 3, in FIG. 4 there is represented a TDMA time frame (10 ms) in which a transmission burst SB occurs with a transmission time SZ and, 5 ms later, a reception burst EB occurs with a reception time EZ (duplex mode). Thus, for example, the mobile unit PT can transmit information to the base station FT during the transmission time SZ of the transmission burst SB and can receive information from the base station PT during the reception time EZ of the reception burst EB (case I).

Alternatively to this, it is also possible that the base station FT transmits information to the mobile unit PT during the transmission time SZ of the transmission burst SB and receives information from the mobile unit PT during the reception time EZ of the reception burst EB (case II). Since the time sequence of the transmission burst SB and reception burst EB is unchangeably prescribed in a TDMA frame in accordance with the DECT standard (5 ms) and this time relationship between the transmission burst SB and reception burst EB represents the time reference variable for the cordless operation of the base station FT and of the mobile unit PT, the base station FT and the mobile unit PT are correspondingly clock-controlled by the timer/counter TI/CO according to FIG. 1 and consequently set to the DECT-specific time frame.

If the user at the mobile unit PT then wishes, for example, to transmit information in the TDMA frame (for example voice messages) to the base station FT, the mobile unit PT must be ready to send at the start of transmission (beginning of the transmission burst SB with the transmission time SZ) UESP. "Ready to send" in this case means that the radio element RE, the controlling element PT and the peripheral elements PE of the mobile unit PT according to FIG. 1 are switched on. This can be achieved, for example, by the said elements being switched on for the entire duration in which the mobile unit PT is put into operation by the user. This has the consequence, however, that on the other hand the energy supply sources of the mobile unit PT (for example battery or storage battery) are loaded to a greater extent (in the sense of energy consumption) and consequently the effective operating duration of the mobile unit PT up to a battery change or charging of the storage battery is reduced.

In order to cater for these two requirements on the mobile unit PT, at least partially, the transmitting/receiving device RE/T, RE/R is activated essentially only during the transmission time SZ of the transmission burst SB. For this activation, the transmitting/receiving device RE-T, RE-R is switched on with a first lead time tv1 with respect to the start of transmission UESP. This first lead time tv1 allows for the fact that the transmitting/receiving device RE-T, RE-R requires a certain running up time in order to be fully functional (running up phase). The first lead time tv1 is in this case dimensioned such that the running up phase of the transmitting/receiving device RE-T, RE-R is ended at the start of transmission UESP.

However, for the eventuality that the running up phase of the transmitting/receiving device RE-T, RE-R is not ended at the start of transmission UESP (for example on account of aging of the electronic components in the mobile unit PT etc.), it may be expedient to provide a second lead time tv2. With this second lead time tv2, it is ensured that the transmitting/receiving device RE-T, RE-R is in any event ready to operate at the start of transmission UESP (running up phase in any event ended). The switching-on instant of the transmitting/receiving device RE-T, RE-R of the mobile unit PT required for information transmission may consequently be determined by the first lead time tv1, the second lead time tv2 or by the total lead time tv1+tv2.

In the case of the representation in FIG. 4, it is assumed that the transmitting/receiving device RE-T, RE-R, which comprises, as described above, on the one hand the field strength measuring device RSSI, the interface RE-I, the change-over switch DS, the selection switch T/R-S and the power amplifier PA—referred to in the following as central functional elements of the transmitting/receiving device RE-T, RE-R—and also on the other hand the transmitter SY/MO and receiver REC, is always switched on simultaneously at the possible switching-on instants.

Alternatively, however, it is also possible that the central functional elements of the transmitting/receiving devices RE-T, RE-R are switched on at different times than the transmitter SY/MO and the receiver REC.

In addition, it is also conceivable to expand the transmission time-related switching-on of the mobile unit PT to all the functional modules of the mobile unit PT which are not required for the monitoring of the TDMA frame clock.

In analogy with the second lead time tv2, it is possible furthermore to define a lag time tn2, with which the transmitting/receiving device RE-T, RE-R is switched off with respect to an end of transmission (end of the transmission time SZ of the transmission burst SB) UEEP. This achieves the effect that the transmitting/receiving device RE-T, RE-R is not switched off too early in the possible event of a time/frequency drift of the timer/counter TI/CO.

The descriptions given above with respect to the transmission burst SB with the transmission time SZ are applicable in a similar way also to the reception burst EB with the reception time EZ, in which the mobile unit PT receives information (for example voice messages) from the base station FT. In addition, the said descriptions of the transmitting/receiving mode of the mobile unit PT within a TDMA frame (case I) are applicable in the same way to the transmitting/receiving mode of the base station FT within a TDMA frame according to FIG. 3 (case II).

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for controlling a transmitting/receiving device of base stations and/or mobile units, in particular of a cordless telephone system, comprising:

each of the base stations and the mobile units having a processor, to which a controlling program is assigned and voice to be transmitted being compressed on a transmission side, transmitted by a transmitting device of a first transmitting/receiving device within a radio link and received by a receiving device of a second transmitting/receiving device and expanded;

the controlling program effecting actuation of the transmitting device of the first transmitting/receiving device substantially only during fixed, predetermined transmission times within a transmission time frame and effecting actuation of the receiving device of the second transmitting/receiving device substantially only during fixed, predetermined reception times within the transmission time frame;

modules for monitoring a frame clock that determines the transmission time frame, the modules being excepted from the time-related activation.

2. The arrangement as claimed in claim 1, wherein the transmitting/receiving device is switched on with a first lead time with respect to the transmission/reception time.

3. The arrangement as claimed in claim 1, wherein the transmitting/receiving device is switched on with a second lead time with respect to said fixed, predetermined transmission/reception time.

4. The arrangement as claimed in claim 1, wherein the transmitting/receiving device is switched off with a lag time with respect to the transmission/reception time.

5. The arrangement as claimed in claim 1, wherein the transmitting/receiving device has subdevices and is also connected to a transmitter and a receiver.

6. The arrangement as claimed in claim 5, wherein the subdevices, the transmitter and the receiver are switched on and off simultaneously.

7. The arrangement as claimed in claim 5, wherein the subdevices, the transmitter and the receiver are switched on and off at different times.

8. The arrangement as claimed in claim 1, wherein said fixed, predetermined transmission/reception time corresponds to a time duration of a transmission/reception burst in a time frame.

* * * * *